(12) United States Patent
Kwon

(10) Patent No.: US 10,455,389 B2
(45) Date of Patent: Oct. 22, 2019

(54) MOBILE TERMINAL AND CONTROL METHOD THEREFOR

(71) Applicant: LG ELECTRONICS INC., Seoul (KR)

(72) Inventor: Yeaeun Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 151 days.

(21) Appl. No.: 15/549,586

(22) PCT Filed: Nov. 17, 2015

(86) PCT No.: PCT/KR2015/012321
§ 371 (c)(1),
(2) Date: Aug. 8, 2017

(87) PCT Pub. No.: WO2016/129781
PCT Pub. Date: Aug. 8, 2016

(65) Prior Publication Data
US 2018/0027357 A1 Jan. 25, 2018

(30) Foreign Application Priority Data
Feb. 9, 2015 (KR) .................. 10-2015-0019610

(51) Int. Cl.
*G06F 13/00* (2006.01)
*H04W 4/70* (2018.01)
(Continued)

(52) U.S. Cl.
CPC ............ *H04W 4/70* (2018.02); *G06F 3/0488* (2013.01); *G06Q 10/10* (2013.01); *G06Q 50/00* (2013.01);
(Continued)

(58) Field of Classification Search
CPC ........... H04W 4/02; H04W 4/70; H04W 4/80; H04M 1/72572; H04M 1/7253;
(Continued)

(56) References Cited

U.S. PATENT DOCUMENTS

| 8,660,580 B2 * | 2/2014 | Kang ................. | H04W 4/02 455/456.3 |
| 8,725,174 B2 * | 5/2014 | Grossman .............. | G08B 21/18 455/456.3 |

(Continued)

FOREIGN PATENT DOCUMENTS

| JP | 2002-175434 A | 6/2002 |
| KR | 10-2003-0079135 A | 10/2003 |
| KR | 10-2007-0033536 A | 3/2007 |
| KR | 10-2010-0083044 A | 7/2010 |

*Primary Examiner* — Kenneth R Coulter
(74) *Attorney, Agent, or Firm* — Birch, Stewart, Kolasch & Birch, LLP

(57) ABSTRACT

A mobile terminal including a wireless communication unit configured to perform wireless communication with another terminal; a display unit configured to display information; and a controller configured to in response to the other terminal being a first distance to the mobile terminal, display first information associated with the other terminal via the display unit, and in response to the other terminal being a second distance closer than the first distance to the mobile terminal, display second information associated with the other terminal via the display unit.

18 Claims, 15 Drawing Sheets

(51) Int. Cl.
*G06F 3/0488* (2013.01)
*H04W 4/02* (2018.01)
*H04M 1/725* (2006.01)
*G06Q 50/00* (2012.01)
*G06Q 10/10* (2012.01)
*H04W 4/80* (2018.01)

(52) U.S. Cl.
CPC ........... *H04M 1/7253* (2013.01); *H04W 4/02* (2013.01); *H04M 1/72519* (2013.01); *H04M 1/72558* (2013.01); *H04M 1/72566* (2013.01); *H04W 4/80* (2018.02)

(58) Field of Classification Search
CPC ......... H04M 1/72558; H04M 1/72566; H04M 1/72519; G06F 3/0488; G06Q 50/00; G06Q 10/10
USPC ................. 709/224, 223, 225, 229, 204–206
See application file for complete search history.

(56) References Cited

U.S. PATENT DOCUMENTS

| | | | |
|---|---|---|---|
| 9,092,532 B2* | 7/2015 | Chen | G06Q 10/10 |
| 9,196,149 B2* | 11/2015 | Grossman | G08B 21/18 |
| 9,510,156 B2* | 11/2016 | Grossman | G08B 21/18 |
| 2010/0178939 A1* | 7/2010 | Kang | H04W 4/02 |
| | | | 455/456.3 |
| 2012/0100866 A1* | 4/2012 | Grossman | G08B 21/18 |
| | | | 455/456.1 |
| 2014/0247126 A1* | 9/2014 | Grossman | G08B 21/18 |
| | | | 340/539.13 |
| 2014/0258281 A1* | 9/2014 | Chen | G06Q 10/10 |
| | | | 707/724 |
| 2014/0342753 A1 | 11/2014 | Demerchant et al. | |
| 2016/0080909 A1* | 3/2016 | Grossman | G08B 21/18 |
| | | | 455/456.3 |

* cited by examiner

FIG. 8
(a)
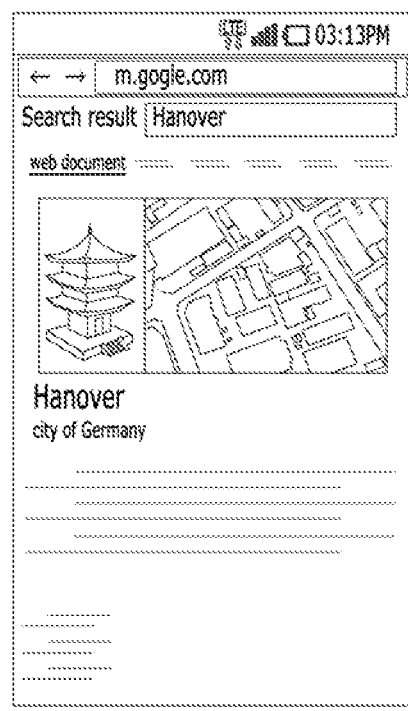
(b)

FIG. 10
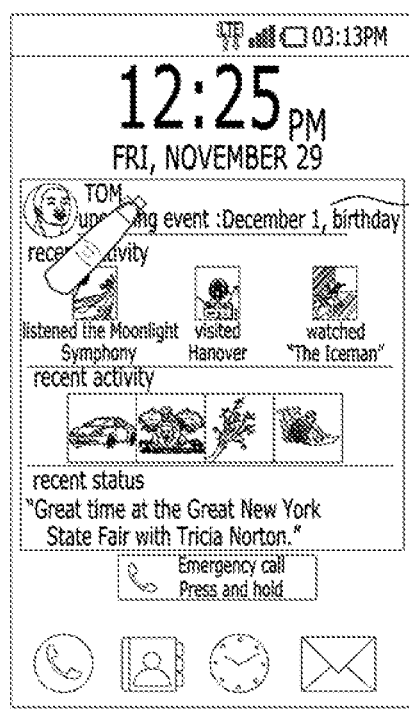
(a)
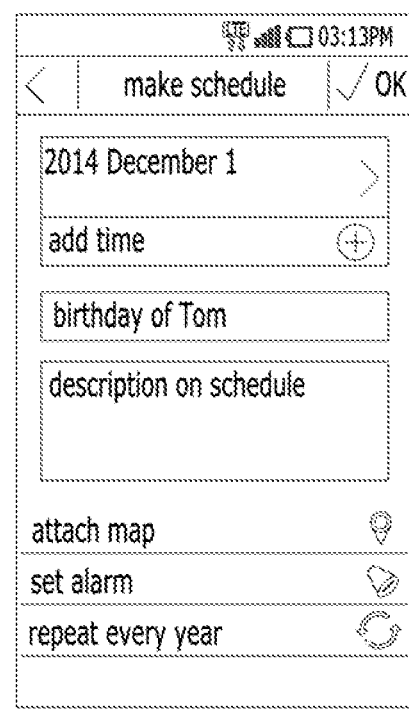
(b)

MOBILE TERMINAL AND CONTROL METHOD THEREFOR

CROSS REFERENCE TO THE RELATED APPLICATIONS

This application is the National Phase of PCT International Application No. PCT/KR2015/012321, filed on Nov. 17, 2015, which claims priority under 35 U.S.C. 119(a) to Korean Application No. 10-2015-0019610, filed on Feb. 9, 2015, all of which are hereby expressly incorporated by reference into the present application.

TECHNICAL FIELD

The present invention relates to a mobile terminal capable of identifying a matter of interest of a user close to the mobile terminal and a method of controlling therefor.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As the functions of the terminals are diversified, for example, the terminals are implemented in a form of a multimedia player equipped with complex functions such as capturing pictures or videos, playing music and video files, gaming, receiving broadcasting, and the like.

As the utilization of a mobile terminal is getting higher, a user is able to check a position of an acquaintance (e.g., a friend, a family member, a fellow worker, etc.) through the mobile terminal. For example, if the mobile terminal obtains location information of other terminal from a server configured to manage the location information and displays the obtained location information on a map, the user is able to check a location of a friend.

Yet, a mobile terminal of the current level provides a user with a location of a friend only. The mobile terminal is unable to inform the user of a matter of recent interest, a trend, and the like of an acquaintance. Hence, although the user meets a friend near the user by chance, since the user is unable to know a matter of interest of the friend, it is difficult to build full conversation.

Hence, the present invention intends to propose a method of providing a user with a matter of interest of a person who is located near the user and has a chance to meet the user.

SUMMARY OF THE INVENTION

An object of the present invention is to provide a mobile terminal capable of enhancing user convenience and a method of controlling therefor.

Another object of the present invention is to provide a mobile terminal capable of identifying information on a matter of interest of a person close to the mobile terminal and a method of controlling therefor.

The other object of the present invention is to provide a mobile terminal capable of more providing information of a user of other terminal as the other terminal is getting close to the mobile terminal and a method of controlling therefor.

Technical tasks obtainable from the present invention are non-limited the above-mentioned technical task. And, other unmentioned technical tasks can be clearly understood from the following description by those having ordinary skill in the technical field to which the present invention pertains.

To achieve these and other advantages and in accordance with the purpose of the present invention, as embodied and broadly described, according to one embodiment, a mobile terminal includes a wireless communication unit configured to perform wireless communication with other terminal, a display unit configured to output information, and a controller, the controller, if the other terminal is close to the mobile terminal, configured to control first information associated with the other terminal to be outputted via the display unit, the controller, if the other terminal is closer to the mobile terminal, configured to control second information associated with the other terminal to be outputted via the display unit.

To further achieve these and other advantages and in accordance with the purpose of the present invention, according to a different embodiment, a method of controlling a mobile terminal, includes the steps of, if other terminal is close to the mobile terminal, outputting first information associated with the other terminal, and if the other terminal is closer to the mobile terminal, outputting second information associated with the other terminal.

Technical solutions obtainable from the present invention are non-limited the above-mentioned technical solutions. And, other unmentioned technical solutions can be clearly understood from the following description by those having ordinary skill in the technical field to which the present invention pertains.

Accordingly, the present invention provides the following effects or advantages.

According to at least one of embodiments of the present invention, it is able to provide a mobile terminal capable of enhancing user convenience.

Specifically, according to the present invention, it is able to provide a mobile terminal capable of identifying information on a matter of interest of a person close to the mobile terminal and a method of controlling therefor.

According to the present invention, it is able to provide a mobile terminal capable of more providing information of a user of other terminal as the other terminal is getting close to the mobile terminal and a method of controlling therefor.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF THE DRAWINGS

FIG. 8 is a diagram for an example of performing web search in response to selection of an interest item;

FIG. 10 is a diagram for an example of adding a schedule in response to selection of an interest item;

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
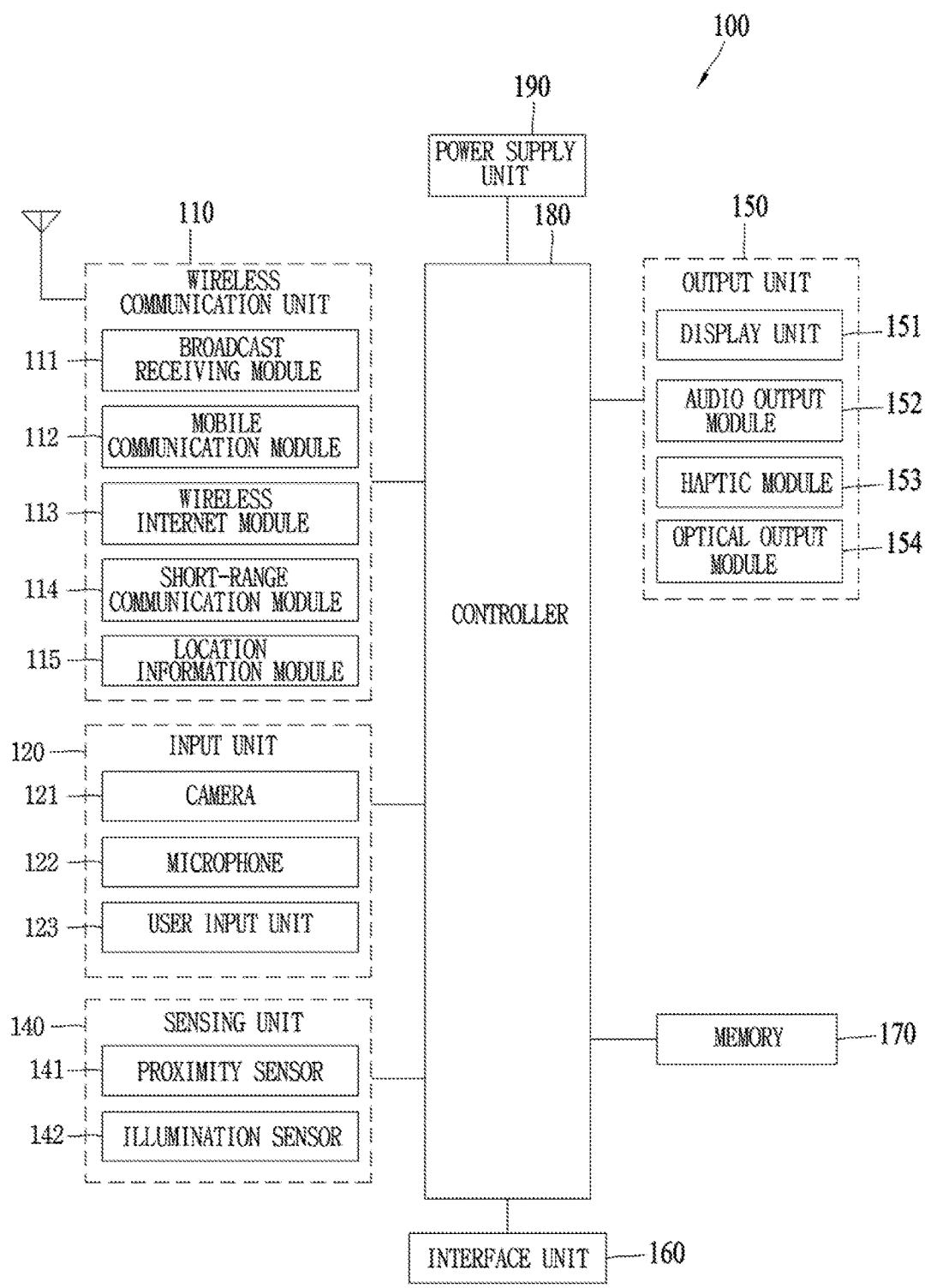
FIG. 1A is a block diagram to describe a mobile terminal in association with the present invention.
Figure 1B:
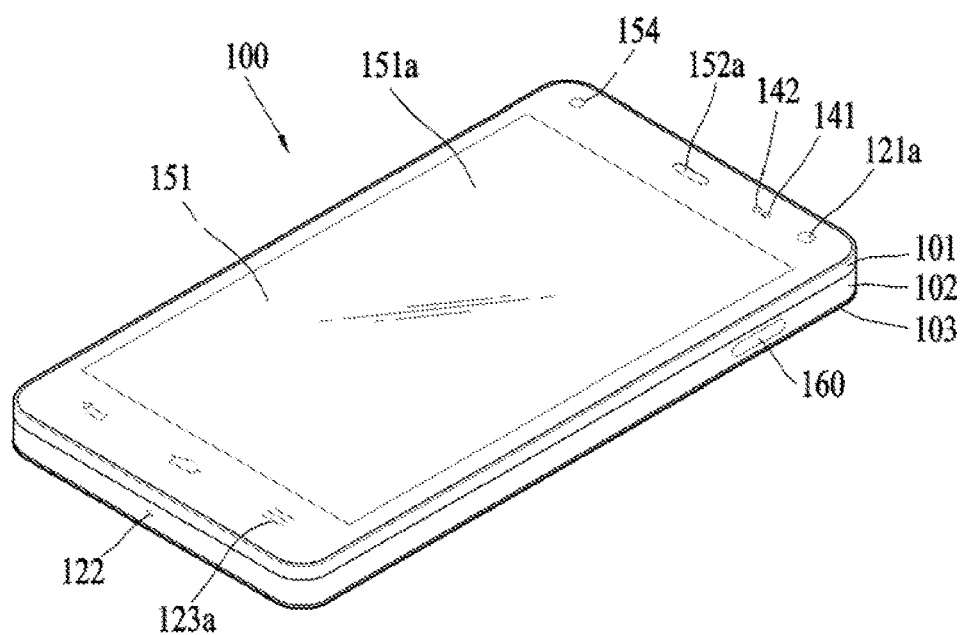
FIGS. 1B and 1C are conceptual diagrams for one example of a mobile terminal in association with the present invention in different views.
Figure 1C:
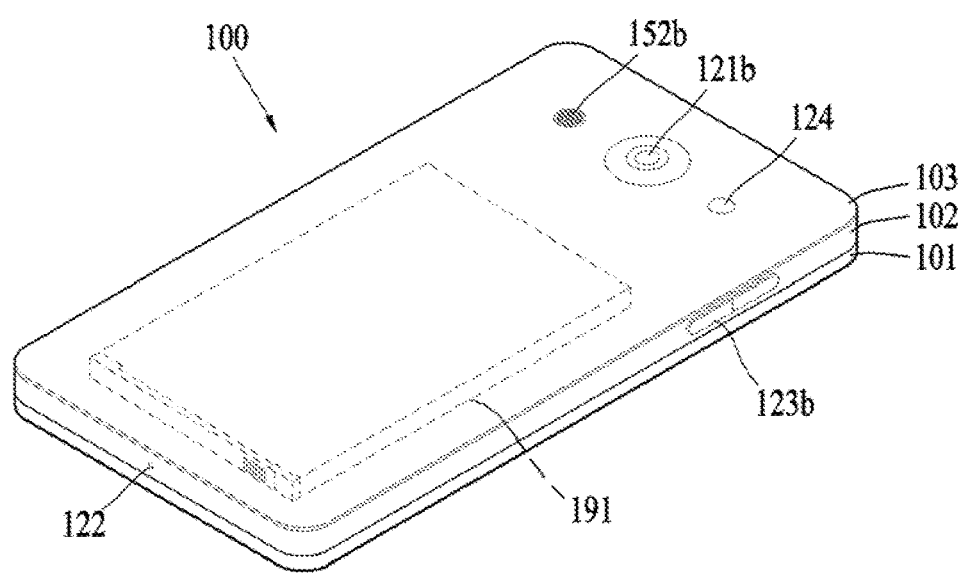

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least a part of the components may operate in a manner of cooperating with each other to implement an operation of a mobile terminal, a control of the mobile terminal, and a method of controlling the mobile terminal according to various embodiments described in the following. The operation, the control, and the method of controlling the mobile terminal can be implemented on the mobile terminal by executing at least one application program stored in the memory 170.

Before the various embodiments implemented by the mobile terminal 100 are explained, the aforementioned components are explained in more detail with reference to FIG. 1A in the following.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like).

Examples of wireless signals transmitted and/or received via the mobile communication module 112 include audio call signals, video (telephony) call signals, or various formats of data to support communication of text and multimedia messages. The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen.

In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors.

The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

In this case, a terminal body can be comprehended as a concept indicating the mobile terminal 100 in a manner of considering the mobile terminal 100 as at least a set. The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be foil red by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 can include a display unit 151, a first and a second audio output module 152a/152b, a proximity sensor 141, an illumination sensor 142, an optical output unit 154, a first and second camera 121a/121b, a first and second manipulation unit 123a/123b, a microphone 122, an interface unit 160, and the like.

In the following, as shown in FIGS. 1B and 1C, the display unit 151, the first audio output module 152a, the proximity sensor 141, the illumination sensor 142, the optical output unit 154, the first camera 121a, and the first manipulation unit 123a are deployed to the front side of the terminal body, the second manipulation unit 123b, the microphone 122, and the interface unit 160 are deployed to the side of the terminal body, and the second audio output module 152b and the second camera 121b are deployed to the rear side of the terminal body.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1a). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

For clarity, assume that a mobile terminal according to the present invention includes at least one of the components shown in FIGS. 1A to 1C. For example, it may assume that the mobile terminal according to the present invention includes the wireless communication unit 110, the display unit 151, the memory 170, and the controller 180 among the components shown in FIGS. 1A to 1C.

If the display unit 151 corresponds to a touch screen, the embodiments described in the following can be more easily implemented. Hence, assume that the display unit 151 corresponds to a touch screen in the following embodiments. In the following embodiments, a touch input is explained as an example of a user input. Yet, a push input for pushing a button or a gesture input for moving a mobile terminal can also be applied to the embodiments.

Figure 2:
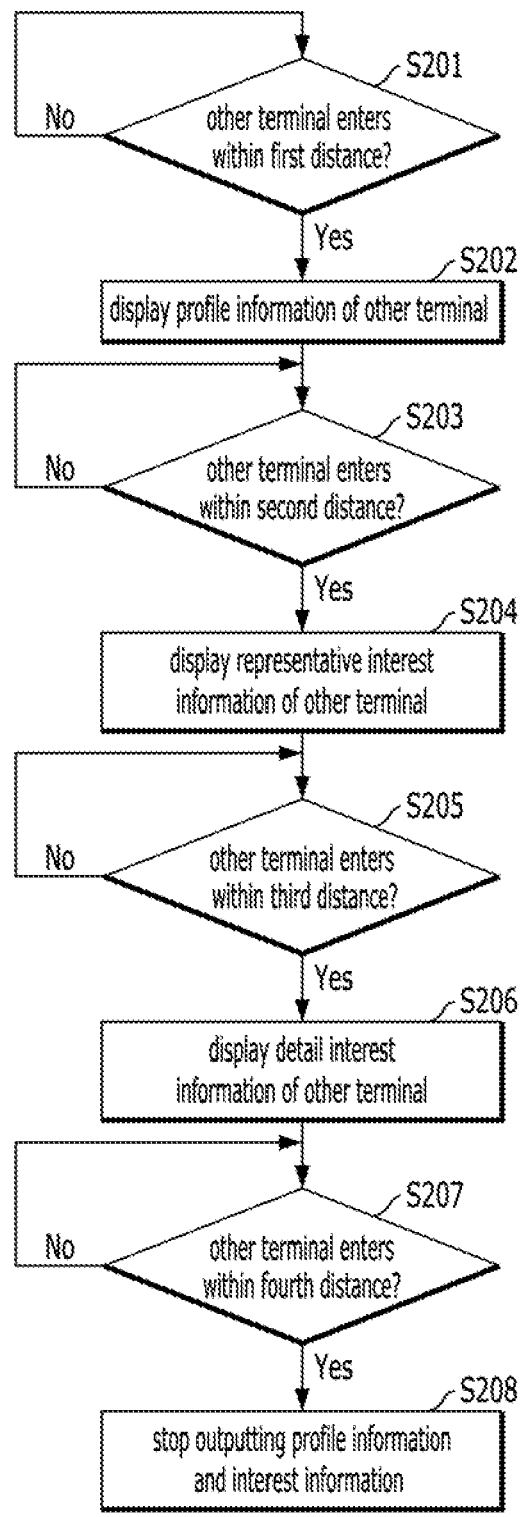
FIG. 2 is a flowchart for a mobile terminal according to one embodiment of the present invention.

Based on the aforementioned description, a mobile terminal according to the present invention is explained in detail. FIG. 2 is a flowchart for a mobile terminal according to one embodiment of the present invention. For clarity, assume that a phone book database is stored in the memory 170 in advance.

If another terminal to which an access authority is assigned is located within a first distance from a mobile terminal (S201), the controller 180 can control profile information of a user of the other terminal to be outputted via the display unit 151 (S202). In this case, the profile information can include a name of a person, a picture, a telephone number, anniversary, and the like.

The profile information can be stored in the memory 170 (e.g., using information of the user of the other terminal registered at a phone book), can be received from the other terminal, or can be received from a prescribed server configured to receive and store the profile information from the other terminal.

The other terminal to which the access authority is assigned may correspond to a terminal registered at a phone book, a terminal at which identification information (e.g., a telephone number, a MAC address, or an IP address, etc.) is registered, a terminal of a person registered as a friend of a user of a mobile terminal (e.g., a terminal of a person registered as a friend at an SNS (social network service) account of a user or a terminal of a person registered as a friend at an IM (instant message) account of the user), and the like.

In order to determine whether or not the other terminal to which the access authority is assigned is located within the first distance from the mobile terminal, the controller 180 can periodically or aperiodically receive location information of the other terminal to which the access authority is assigned from a location information server (not depicted). The controller 180 compares the location information of the other terminal received from the location information server with location information of the mobile terminal to determine whether or not the other terminal to which the access authority is assigned is located within the first distance from the mobile terminal.

As a different example, the mobile terminal can directly receive the location information of the other terminal from the other terminal. In this case, the controller 180 compares the location information received from the other terminal with the location information of the mobile terminal to determine whether or not the other terminal to which the access authority is assigned is located within the first distance from the mobile terminal.

The location information of the mobile terminal can be obtained based on data (e.g., data received via a GPS, data received via an AP, data received from an eNB, etc.) received via the wireless communication unit 110 or can be obtained based on information received from a location information server.

In the following, when other terminal to which an access authority is assigned is getting close to a mobile terminal within a first distance from the mobile terminal, an example of outputting profile information of a user of the other terminal is explained.

Figure 3:
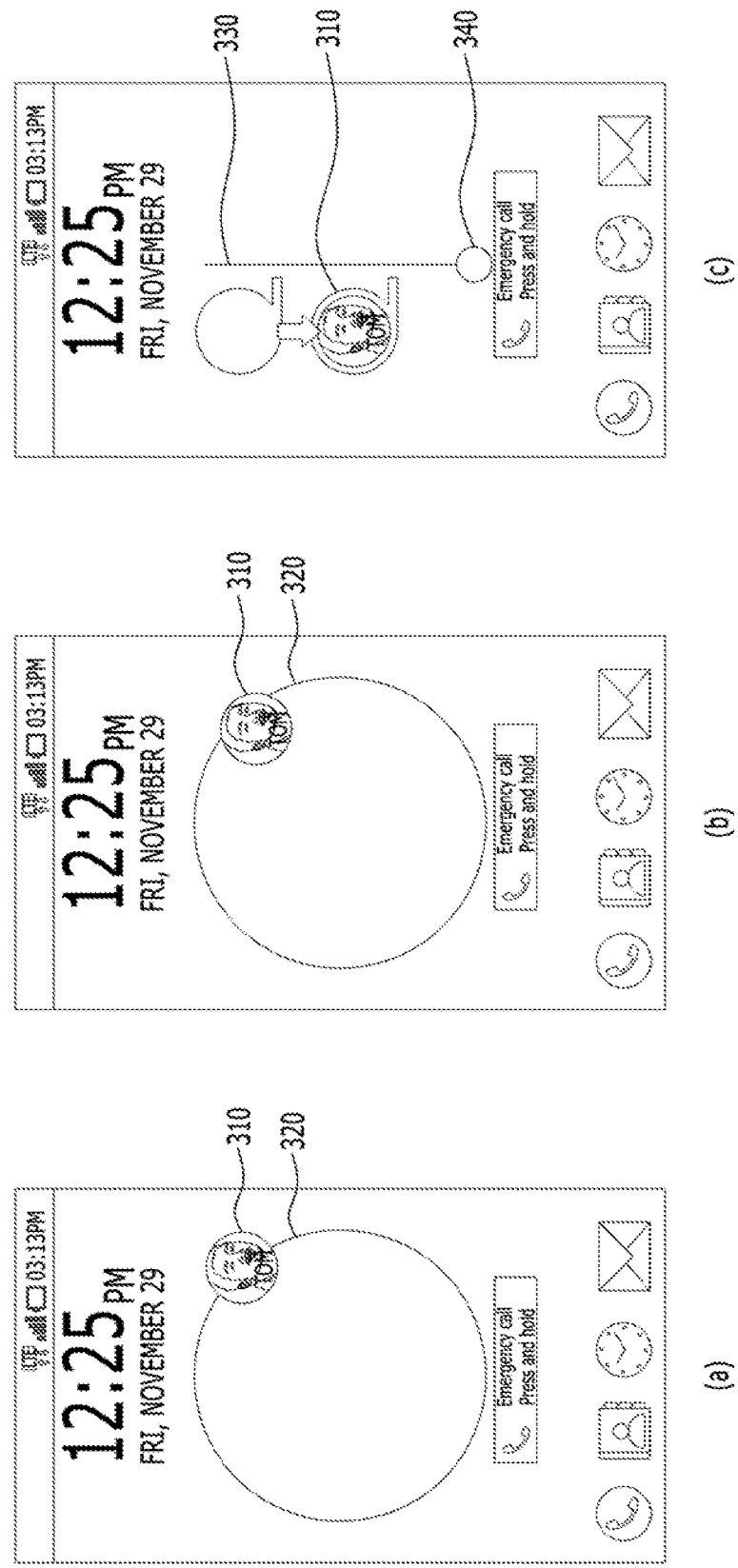
FIG. 3 is a diagram for an example of outputting profile information of a user of other terminal.

FIG. 3 is a diagram for an example of outputting profile information of a user of another terminal. If the other terminal located within a first distance from a mobile terminal is detected, the controller 180 can control profile information 310 of a user of the other terminal to be outputted. For example, as shown in FIGS. 3 (a) and (b), a name and a picture of the user of the other terminal can be outputted.

In this case, a display position of the profile information 310, which is outputted via the display unit 151, can be adjusted based on a distance between the mobile terminal and the other terminal.

For example, as shown in FIG. 3, the controller 180 outputs a circle 320 of a prescribed radius and can then determine a distance between a center of the circle and the position at which the profile information 310 is displayed based on the distance between the mobile terminal and the other terminal. In particular, as the distance between the mobile terminal and the other terminal is getting shorter, the display position of the profile information 310 is getting close closer to the center of the circle 320.

Referring to FIGS. 3 (a) and (b), the display position of the profile information 310 shown in FIG. 3 (b) is closer to the center of the circle 310 compared to the display position of the profile information 310 shown in FIG. 3 (a). In particular, it is able to anticipate that the distance between the mobile terminal and the other terminal is shorter in a state of FIG. 3 (b) compared to a state of FIG. 3 (a).

In addition, as the other terminal is getting closer to the mobile terminal, the controller 180 can control a size of the profile information 310 to be increased. For example, assume that a profile picture of a user of the other terminal is outputted. In this case, a size of the profile picture may increase as the other terminal is getting closer to the mobile terminal. Referring to FIGS. 3 (a) and (b), the size of the profile picture shown in FIG. 3 (b) is greater than the size of the profile picture shown in FIG. 3 (a). In particular, it is able to anticipate that the distance between the mobile terminal and the other terminal is shorter in the state of FIG. 3 (b) compared to the state of FIG. 3 (a).

Referring to FIGS. 3 (a) and (b), the circle 320 is outputted via the display unit 151 and the distance between the mobile terminal and the other terminal can be determined based on a distance between the profile information 310 and the center of the circle 320.

It may also be able to display the distance between the mobile terminal and the other terminal using a method different from the method mentioned earlier in FIGS. 3 (a) and (b). For example, it may be able to roughly display the distance between the mobile terminal and the other terminal by outputting the profile information 310 on a straight line (or an invisible virtual line) 330. For example, according to an example shown in FIG. 3 (c), when one end 340 of the straight line 330 corresponds to a location of the mobile terminal, if a distance from the mobile terminal is increasing, it may be able to configure the profile information 310 to be far from the one end 340 of the straight line 330. If the distance from the mobile terminal is decreasing, it may be able to configure the profile information 310 to be closer to the one end 340 of the straight line 330. For example, as shown in FIG. 3 (c), if the profile information 310 is closer to one end 340 of the straight line 330, it is able to anticipate that the distance between the mobile terminal and the other terminal becomes shorter.

If the distance between the mobile terminal and the other terminal becomes shorter, the controller 180 can control interest information of a user of the other terminal to be outputted via the display unit 151. In this case, the interest information of the user of the other terminal can include at least one selected from the group consisting of a matter of interest recently interested by the user of the other terminal, a recent activity of the user of the other terminal, a recent status of the user of the other terminal, and an anniversary of the user of the other terminal. In this case, the matter of interest of the user of the other terminal may correspond to a book recently read by the user of the other terminal, a video recently watched by the user of the other terminal, a music recently listened by the user of the other terminal, a recently visited place, and the like. In particular, the matter of interest of the user of the other terminal may correspond to a recently watched multimedia file or a place recently visited by the user of the other terminal. The activity of the user of the other terminal may correspond to data used for web search or data uploaded to SNS such as a keyword recently used by the user of the other terminal for web search, a picture recently posted on SNS, a posting recently posted on SNS, and the like. The recent status of the user of the other terminal can include a posting recently posted on SNS by the user of the other terminal, a greeting (or a status message) registered at a messenger service of the user of the other terminal, and the like. The anniversary of the user of the other terminal may correspond to birthday of the user of the other terminal, a wedding anniversary of the user of the other terminal, and the like.

In this case, the 'recent' may mean time ranging from prescribed time in the past to current time or the last event of the user of the other terminal. For example, a recently read book may correspond to a book read by a user from a week ago until now or a book lastly read by the user on the basis of the current time.

The interest information can be received from the other terminal or a prescribed server configured to receive and store the interest information from the other terminal. In this case, if the user of the other terminal approaches within a second distance (S203), the controller 180 outputs a representative interest item (hereinafter, representative interest information) among various interest items of the user of the other terminal (S204). If the other terminal approaches within a third distance (S205), the controller can control a list of interest items interested by the user of the other terminal (hereinafter, detail interest information) to be outputted (S206).

In this case, the representative interest information may correspond to an item most recently interested by the user of the other terminal or an item of which an interest frequency of the user is highest for a prescribed period among various interest items (in this case, the interest items can include a matter of interest of a user, an activity of the user, a status of the user, and the like) of the user of the other terminal. For example, if the user of the other terminal searches for travel information, listens to music, and then reads a book, book information related to the lastly performed book reading operation can be designated as the representative interest information. As a different example, if the user of the other terminal searches for 'Seoul' the most as many as 15 times via a web during a prescribed period, the 'Seoul' corresponding to a keyword having the largest search number can be designated as the representative interest information. As a further different example, an anniversary of the user of the other terminal or a keyword most frequently mentioned on SNS by the user of the other terminal can be designated as the representative interest information.

Figure 4:
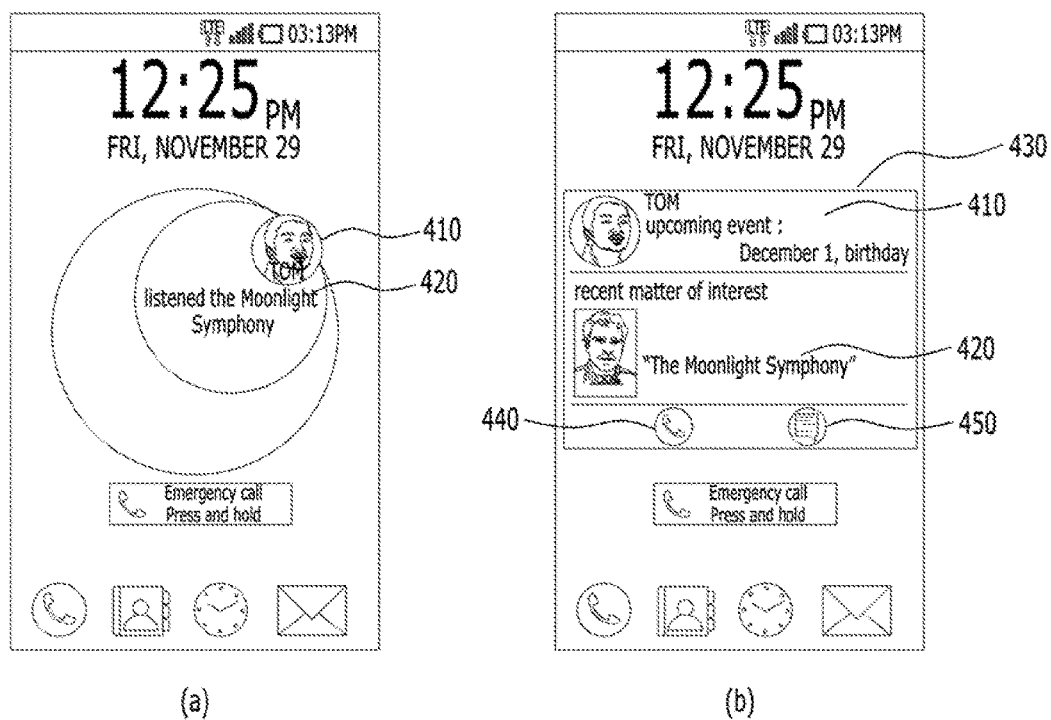
FIG. 4 is a diagram for an example of outputting representative interest information.

In the following, an example of outputting representative interest information and detail interest information is explained in detail with reference to FIGS. 4 and 5. FIG. 4 is a diagram for an example of outputting representative interest information. If the other terminal enters into a second distance from a mobile terminal, as shown in the example of FIG. 4 (a), the controller 180 can control representative interest information 420 of a user of the other terminal to be outputted. For example, FIG. 4 (a) shows a case that profile information 410 of the user of the other terminal and information 420 on music recently listened by the user of the other terminal are outputted as the representative interest information.

As a different example, as shown in the example of FIG. 4 (b), the controller 180 can control a pop-up window 430 including the representative interest information of the user of the other terminal to be outputted. In this case, the pop-up window 430 may include a button 440/450 for making a call or sending a message to the user of the other terminal.

As shown in the example of FIGS. 4 (a) and (b), the controller 180 can control the profile information 410 and the interest information 420 to be outputted at the same time. Unlike the example, the controller 180 can control the output of the profile information to be terminated and control the representative interest information of the user of the other terminal to be outputted.

As a further different example, the controller 180 can control the representative interest information of the user of the other terminal to be outputted while maintaining the output of partial profile information and terminating the output of the remaining profile information. For example, when a name and a profile picture of a user are outputted, if the other terminal enters into a second distance from the mobile terminal, the controller 180 can control representative interest information to be additionally outputted while terminating the output of the name and maintaining the output of the profile picture.

Figure 5:
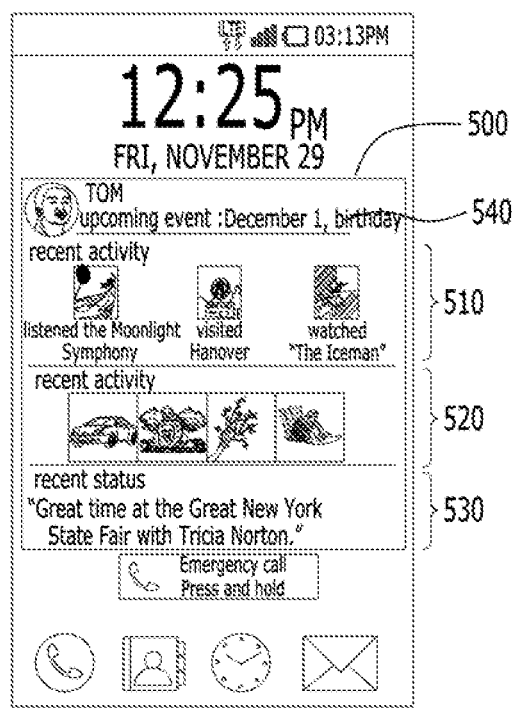
FIG. 5 is a diagram for an example of outputting detail interest information.

FIG. 5 is a diagram for an example of outputting detail interest information. If the other terminal enters into a third distance from a mobile terminal, as shown in the example of FIG. 5, the controller 180 can control detail interest information of a user of the other terminal to be outputted. FIG. 5 illustrates a case that a pop-up window 500 including a matter of recent interest 510 of the user of the other terminal, a recent activity 520 of the user of the other terminal, a recent status 530 of the user of the other terminal, anniversary information 540 of the user of the other terminal, and the like is outputted.

If an anniversary of the user of the other terminal is configured, the controller 180 can control the anniversary of the user of the other terminal to be exposed to the top of the pop-up window.

FIGS. 4 and 5 illustrate an example that interest information of the user of the other terminal is outputted according to the approach of the other terminal approached to the mobile terminal. Unlike the example, if profile information outputted via the display unit 151 is selected, the controller 180 can control the selected interest information of the user to be outputted.

Figure 6:
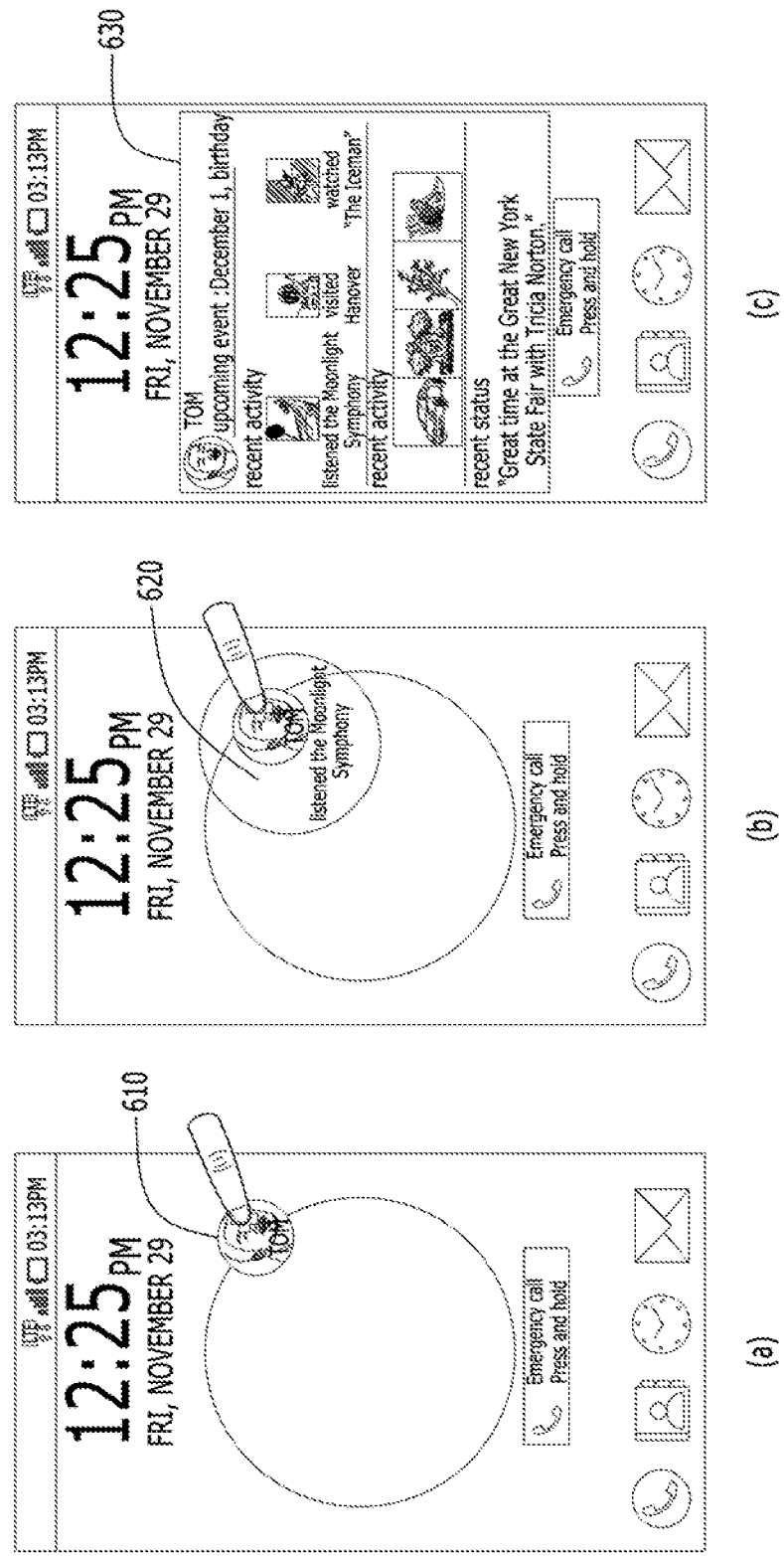
FIG. 6 is a diagram for an example of outputting interest information.

As an example, FIG. 6 is a diagram for an example of outputting interest information. If it is determined as the other terminal is located within a first distance from a mobile terminal, as shown in the example of FIG. 6 (a), the controller 180 can control profile information 610 of a user of the other terminal to be outputted. If the profile information 610 is touched, as shown in the example of FIG. 6 (b), the controller 180 can control representative interest information 620 of the user of the other terminal to be additionally outputted.

If the profile picture 610 is touched again, as shown in the example of FIG. 6 (c), the controller 180 can control detail interest information 630 of the selected user to be outputted. Unlike the example shown in FIG. 6, if the profile information 610 is touched, the controller 180 can control the detail interest information 630 of the user of the other terminal to be immediately outputted.

FIGS. 3 to 6 show the display unit 151 capable of outputting profile information or interest information. In this case, the profile information or the interest information can be displayed on a lock screen or can be displayed on a standby screen (or home screen) after the mobile terminal is unlocked. If the mobile terminal is in a power saving mode and the display unit 151 is turned off, the controller 180 can control the profile information or the interest information to be outputted while terminating the power saving mode of the mobile terminal.

If the other terminal enters into a fourth distance from the mobile terminal (S206), the controller 180 can terminate the output of the profile information or the interest information (S207). This is because, if the other terminal and the mobile terminal are very close, since it is able to anticipate that conversation is going to start between a user of the mobile terminal and the user of the other terminal, it is not necessary to output the profile information or the interest information anymore.

If a distance between the other terminal and the mobile terminal becomes longer, an operation of the mobile terminal can be performed in a direction opposite to the flow shown in FIG. 2. For example, if the other terminal located within the second distance is getting far from the mobile terminal and deviates from the second distance (while still existing within the first distance), the controller 180 can control the output of the representative interest information to be terminated and controls the profile information to be outputted.

Yet, if the output of the profile information and the interest information is terminated due to the distance between the mobile terminal and the other terminal equal to or less than the fourth distance, although the distance between the mobile terminal and the other terminal increases, the profile information and the interest information may not be outputted. This is because, if the distance between the mobile terminal and the other terminal is equal to or less than the fourth distance, since it is able to anticipate that conversation is going to start between a user of the mobile terminal and the user of the other terminal, it is not necessary to inform the user of the mobile terminal of a matter of interest of the user of the other terminal anymore.

In the example mentioned above, the first distance, the second distance, the third distance, and the fourth distance may correspond to physically measurable distances (e.g., the first distance: 100 m, the second distance: 50 m, the third distance: 10 m, the fourth distance: 2 m). In this case, the controller 180 compares location information of the mobile terminal with location information of the other terminal to determine whether or not the other terminal is located within a prescribed distance from the mobile terminal. In this case, the controller 180 can determine whether or not the other terminal enters into the prescribed distance or whether or not the mobile terminal and the other terminal are separated from each other more than the prescribed distance in consideration of a margin.

For example, assume that the second distance corresponds to 50 m. In this case, when a margin of 3 m is set to the approach of the other terminal approaching the mobile terminal and a margin of 5 m is set to the other terminal getting far from the mobile terminal, if the other terminal is located within a range of 47 m from the mobile terminal, the controller 180 can determine it as the other terminal is located within the second distance from the mobile terminal. Moreover, if the other terminal is separated from the mobile terminal more than 55 m, the controller 180 can determine it as the other terminal is separated from the mobile terminal more than the second distance.

If a margin is configured, although the other terminal moves in and out of a boundary of a prescribed criteria (e.g., when the second distance corresponds to 50 m and the other terminal moves with a distance of 49 to 51 m from the mobile terminal), it may be able to prevent information to be outputted via the mobile terminal from being repeatedly changed during a short time period.

Instead of using a physically measurable distance, if a relation with the other terminal satisfies a prescribed condition, the controller 180 can control the profile information or the interest information of the user of the other terminal to be outputted. For example, if a signal (e.g., beacon) transmitted by the other terminal is received, the controller 180 determines it as the other terminal and the mobile terminal are close enough. The controller 180 can control profile information of the user of the other terminal to be outputted. In this case, the controller 180 can check whether or not an access authority is assigned to the other terminal based on identification information of the other terminal included in the signal. As a different example, if strength of the received beacon is equal to or greater than a prescribed reference value, the controller 180 can control the profile information of the user of the other terminal to be outputted.

If the other terminal and the mobile terminal are closer to each other and strength of a signal received from the other terminal exceeds the reference value, the controller 180 can control interest information to be outputted. In this case, a case that the signal strength is equal to or greater than a first reference value is distinguished from a case that the signal strength is equal to or greater than a second reference value. In the former case, representative profile information is outputted. In the latter case, detail profile information can be outputted.

In addition, if the other terminal and the mobile terminal are closer to each other and strength of a signal received from the other terminal is equal to or greater than a third reference value, the controller 180 can terminate the output of the profile information and the interest information.

In the example mentioned above, it is able to output profile information or interest information on the basis of strength of a signal received from the other terminal. As a different example, the controller can control the profile information or the interest information to be outputted based on a distance between the mobile terminal and the other terminal. In this case, the distance can be calculated based on the signal strength.

If at least one of interest items of the user of the other terminal is selected while detail profile information is outputted, the controller 180 may request to transmit a multimedia file corresponding to the selected interest item or may perform web search corresponding to the selected item. As a different example, the controller 180 may move to an SNS posting corresponding to the selected interest item or may add the selected interest item to a schedule.

When an interest item is selected, an operation of a mobile terminal is explained in detail with reference to drawings described in the following. FIGS. 7 to 10 are diagrams for explaining an operation of a mobile terminal when one of detail interest information is selected from among the outputted detail interest information.

Figure 7:
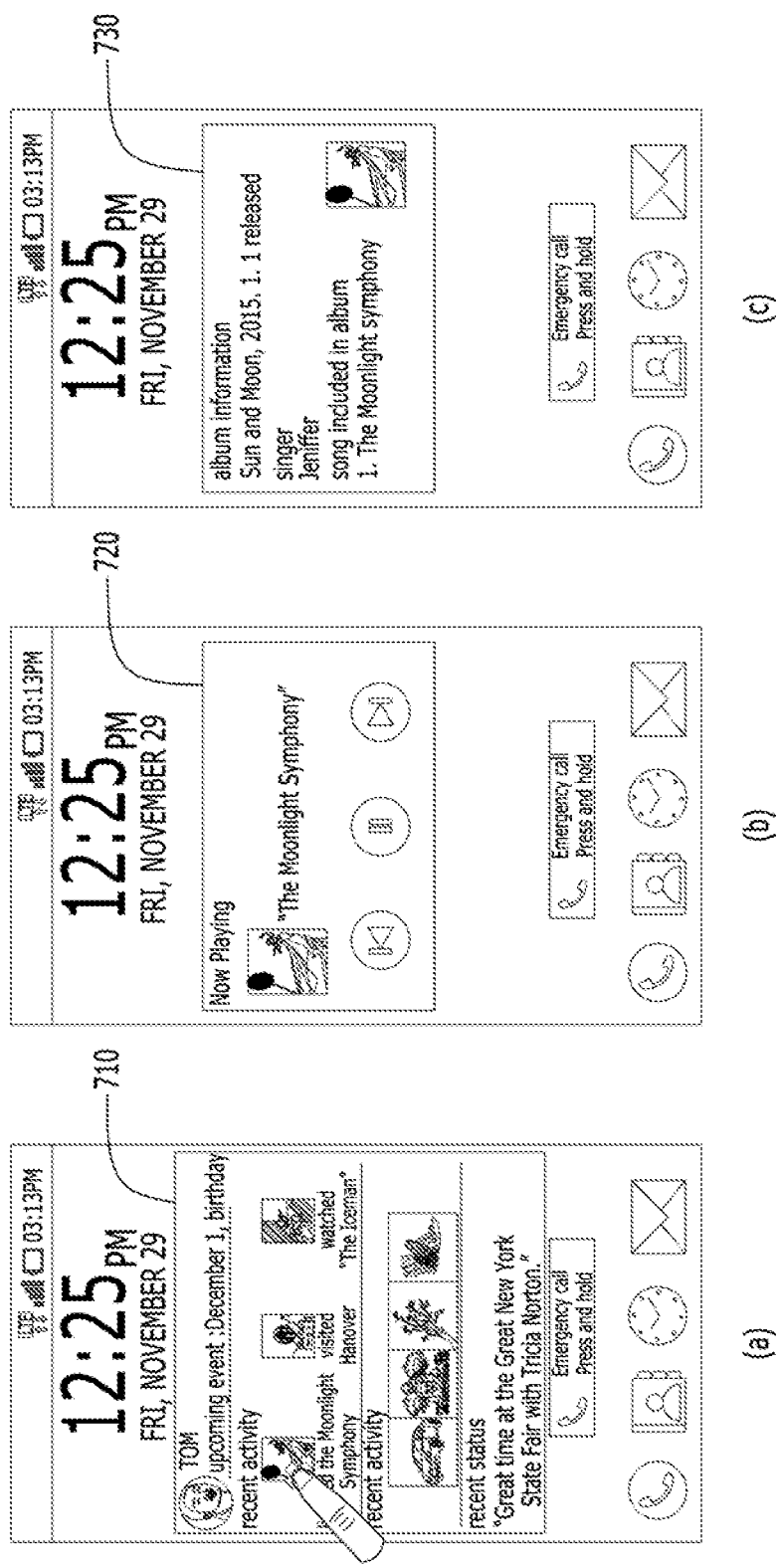
FIG. 7 is a diagram for an example of receiving a multimedia file in response to selection of an interest item.

FIG. 7 is a diagram for an example of receiving a multimedia file in response to selection of an interest item. If a multimedia file such as a music file, a video file, a picture file, or the like recently watched by a user of other terminal is selected while detail interest information is outputted, the controller 180 can ask the other terminal to transmit the selected multimedia file. For example, as shown in the example of FIG. 7 (*a*), if music 710 listened by the user of the other terminal is touched, the controller 180 can ask the other terminal to transmit the selected music file. If the selected music file is received, as shown in the example of FIG. 7 (*b*), the controller 180 can start to play 720 the received music file.

As a different example, the controller 180 can control information related to the multimedia file, which is listened by the user of the other terminal, to be outputted. For example, if the music 710 listened by the user of the other terminal is touched, as shown in the example of FIG. 7 (*c*), the controller 180 can control information 730 on a singer of the music listened by the user and an album containing the music to be outputted. In this case, the information 730 on the singer and the album can be obtained via web search using a predetermined search engine or can be received from a prescribed server.

FIG. 8 is a diagram for an example of performing web search in response to selection of an interest item. If a user of other terminal selects a keyword used for web search or a recently visited place while detail interest information is outputted, the controller 180 can perform the web search using the keyword previously used by the user of the other terminal or a name of the place. For example, as shown in the example of FIG. 8 (a), if the user of the other terminal selects "Hanover" item 810, as shown in the example of FIG. 8 (b), the controller 180 can control a web search to be performed using the "Hanover" as a keyword.

Figure 9:
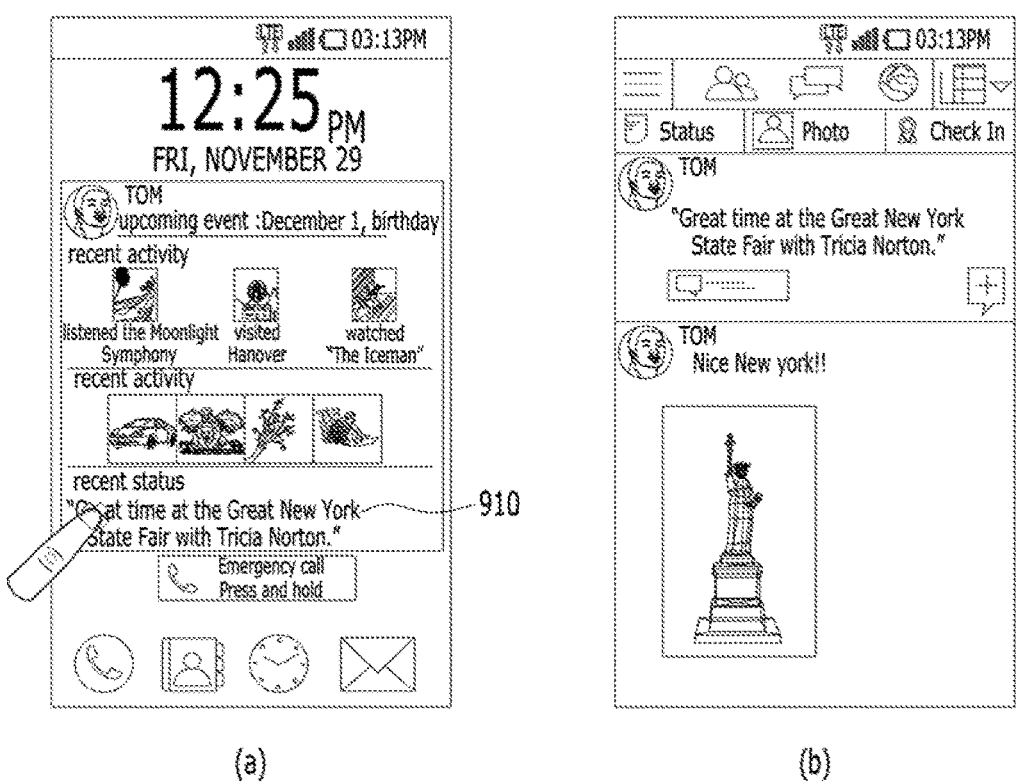
FIG. 9 is a diagram for an example of moving to an SNS account of a user of other terminal in response to selection of an interest item.

FIG. 9 is a diagram for an example of moving to an SNS account of a user of other terminal in response to selection of an interest item. If a picture or a posting posted by a user of other terminal on SNS is selected while detail interest information is outputted, the controller 180 can move to an SNS account of the user of the other terminal. For example, as shown in the example of FIG. 9 (a), if a posting 910 posted by the user on SNS is touched, as shown in the example of FIG. 9 (b), the controller 180 can move to the SNS account of the user of the other terminal.

FIG. 10 is a diagram for an example of adding a schedule in response to selection of an interest item. If an anniversary of a user of other terminal is selected while detail interest information is outputted, the controller 180 can control a user interface for registering the selected anniversary at a schedule to be outputted. For example, as shown in the example of FIG. 10 (a), if a birthday 1010 of the user of the other terminal is touched, as shown in the example of FIG. 10 (b), the controller 180 can control a user interface for registering the birthday of the user of the other terminal at a schedule to be outputted.

Figure 11:
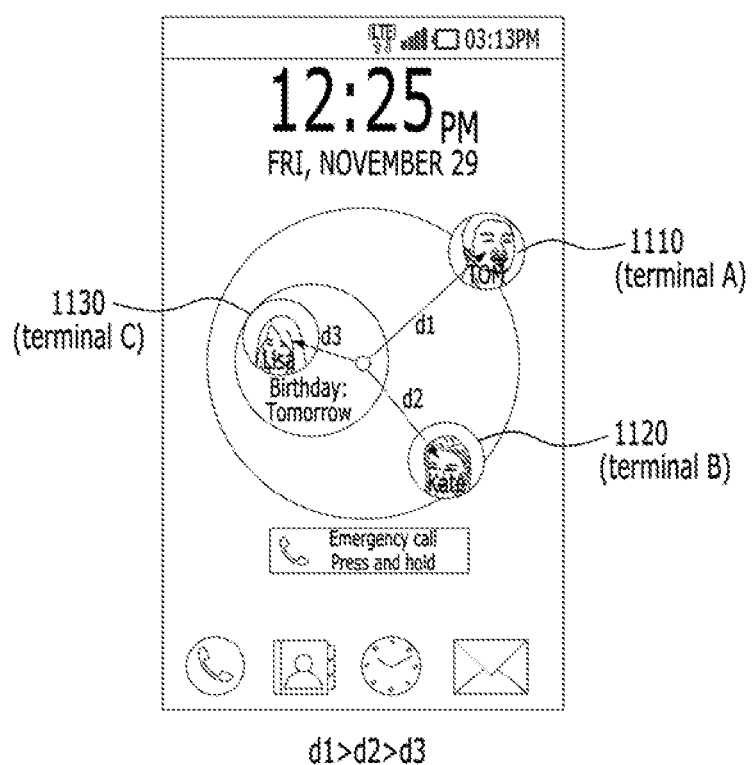
FIG. 11 is a diagram for an example of outputting profile information or interest information of a plurality of other terminals.

If a plurality of other terminals to which an access authority is assigned are located in the vicinity of a mobile terminal, the controller 180 can control profile information or interest information of each of a plurality of the other terminals to be outputted. For example, FIG. 11 is a diagram for an example of outputting profile information or interest information of a plurality of other terminals. For clarity, other terminals located in the vicinity of a mobile terminal are referred to as a terminal A, a terminal B, and a terminal C.

If the terminal A and the terminal B are located within a first distance from the mobile terminal and the terminal C is located within a second distance from the mobile terminal, as shown in the example of FIG. 11, the controller 180 can control profile information 1110 of the terminal A, profile information 1120 of the terminal B, and representative interest information 1130 of the terminal C to be outputted. In this case, the controller 180 can control the extent of separating the information from the center of a circle in consideration of a distance between the terminals A to C and the mobile terminal. Referring to the example shown in FIG. 11, since the representative interest information of the terminal C is closest from the center of the circle and the profile information of the terminal A is farthest from the center of the circle, it is able to anticipate that a separation distance from the mobile terminal can be represented as terminal A<terminal B<terminal C.

Figure 12:
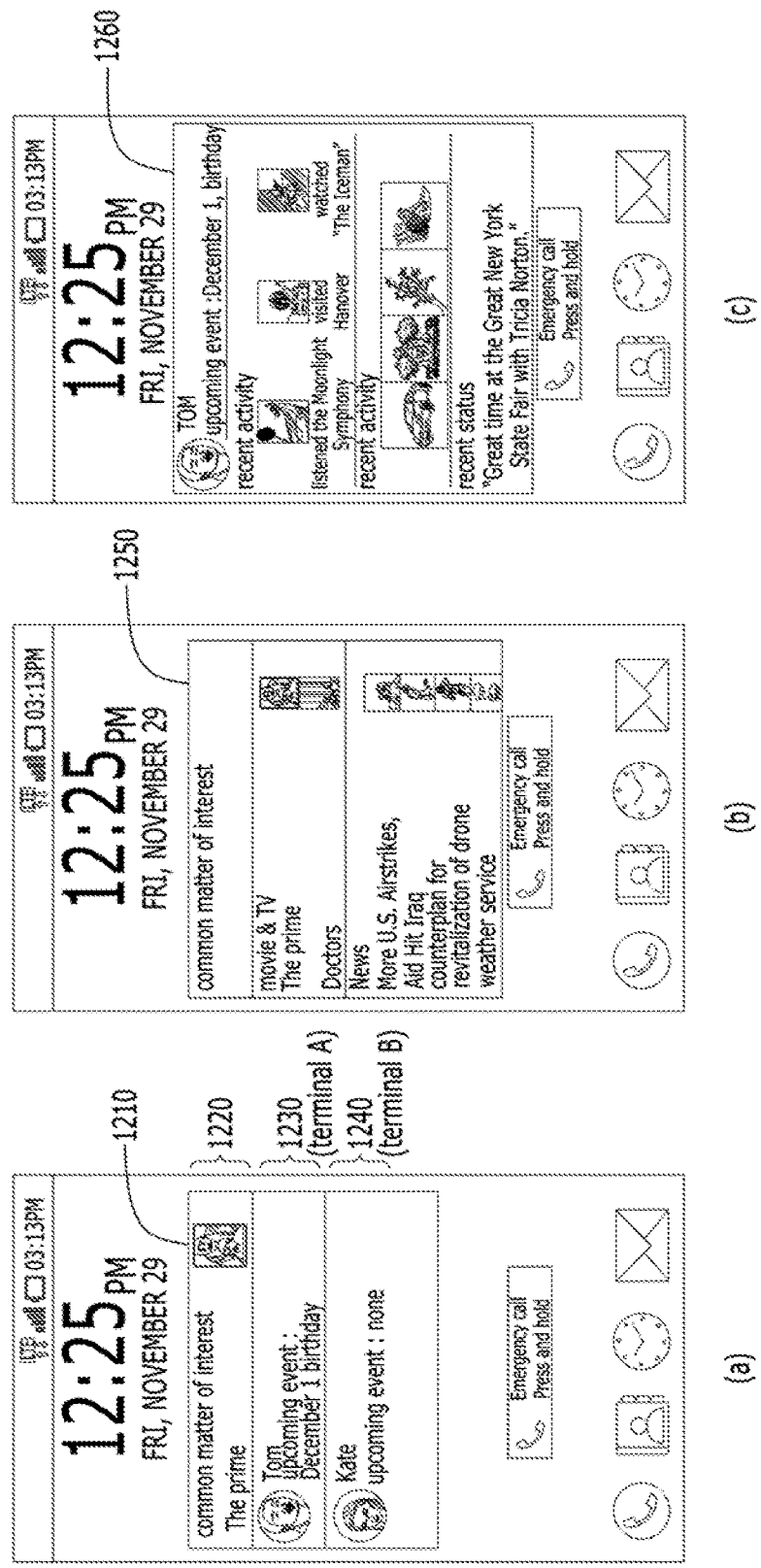
FIG. 12 is a diagram for an example of outputting common interest information of two or more terminals.

If two or more terminals enter into a prescribed distance from the mobile terminal, the controller 180 may output common interest information of the two or more terminals. For example, FIG. 12 is a diagram for an example of outputting common interest information of two or more terminals. If a terminal A and a terminal B enter into a third distance from a mobile terminal, as mentioned earlier in FIG. 5, the controller 180 can control detail interest information of the terminal A or detail interest information of the terminal B to be outputted.

In this case, if both the terminal A and the terminal B are located within the third distance from the mobile terminal, the controller 180 selects an overlapped interest item from among the detail interest information of the terminal A and the detail interest information of the terminal B and can control interest information common to the terminal A and the terminal B to be outputted.

For example, as shown in the example of FIG. 12 (a), the controller 180 can control a pop-up window 1210 including the interest item common to the terminal A and the terminal B to be outputted. Referring to the example shown in FIG. 12, the interest item 1220 common to the terminal A and the terminal B is outputted to the top of the pop-up window and profile information 1230 of the terminal A and profile information 1240 of the terminal B are outputted at the bottom of the common interest item.

If a plurality of interest items are common to the terminal A and the terminal B, the controller 180 displays one of a plurality of the interest items only. If a common interest item is touched, the controller 180 can control a list of a plurality of the interest items to be outputted. For example, as shown in the example of FIG. 12 (a), if a user input for touching a common interest item exposed to the top of the pop-up window is received, as shown in the example of FIG. 12 (b), the controller 180 can control a list 1250 of interest items common to the terminal A and the terminal B to be outputted.

If a user input for touching profile information of the terminal A or profile information of the terminal B is received, the controller 180 can control detail interest information of a selected user to be outputted. For example, as shown in the example of FIG. 12 (a), if the profile information 1230 of the terminal A is touched, as shown in the example of FIG. 12 (c), the controller 180 can control detail interest information 1260 of the terminal A to be outputted.

Referring to the example shown in FIG. 12 (a), the profile information of the terminal A and the profile information of the terminal B are outputted together with the interest information common to the terminal A and the terminal B. Unlike the example, the controller 180 can control representative interest information or detail interest information of the terminal A and the terminal B to be outputted together with the interest information common to the terminal A and the terminal B. Although it is not depicted in the drawing, if an anniversary of at least one of the terminal A and the terminal B is configured, the controller 180 can control the anniversary to be exposed to the top of the pop-up window.

Referring to FIG. 12 (a), the common interest information, the profile information of the terminal A, and the profile information of the terminal B are outputted only through the pop-up window 1210. Unlike the example shown in FIG. 12 (a), the controller 180 can control interest information (representative interest information or detail interest information) of either the terminal A or the terminal B to be further outputted via the pop-up window together with the common interest information, the profile information of the terminal A, and the profile information of the terminal B. In this case, the interest information to be outputted among the interest information of the terminal A and the interest information of the terminal B can be determined based on a distance between the terminals and the mobile terminal, a contact frequency between the terminal A and the terminal B, or whether or not a contact is performed recently.

For example, if the terminal A is closer to the mobile terminal compared to the terminal B, the controller 180 can control the interest information of the terminal A to be additionally outputted via the pop-up window 1210. If a contact frequency of the terminal A is higher among the terminal A and the terminal B, the controller 180 can control the interest information of the terminal A to be additionally outputted via the pop-up window 1210. Or, if the terminal B is recently contact (telephone call or message transmission) with the mobile terminal among the terminal A and the terminal B, the controller 180 can control the interest information of the terminal B to be additionally outputted via the pop-up window 1210.

Referring to the example of FIG. 12 (a), the interest information common to the terminal A and the terminal B is outputted. Unlike the example, the controller 180 can control detail interest information of the terminal A and detail interest information of the terminal B to be outputted, respectively.

Figure 13:
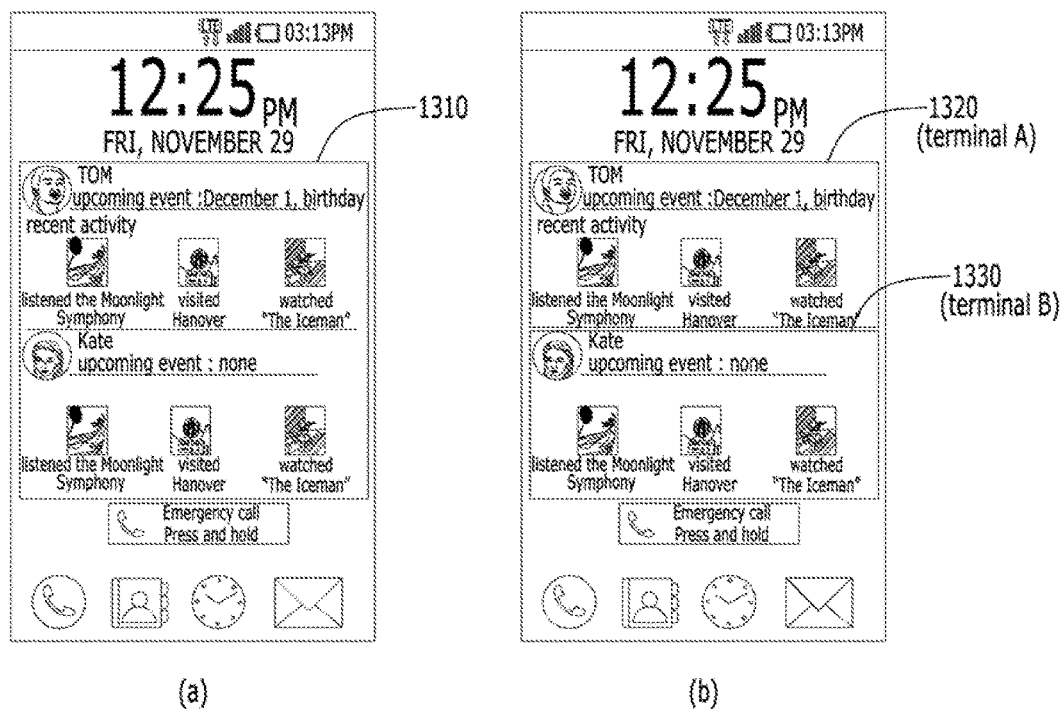
FIG. 13 is a diagram for an example of outputting detail interest information of a terminal A and a terminal B.

For example, FIG. 13 is a diagram for an example of outputting detail interest information of a terminal A and a terminal B. If both the terminal A and the terminal B are located within a third distance from the mobile terminal, as shown in the example shown in FIG. 13 (a) or FIG. 13 (b), the controller 180 can control detail interest information of the terminal A and detail interest information of the terminal B to be outputted.

Referring to FIG. 13 (a), the detail interest information of the terminal A and the detail interest information of the terminal B are outputted via a single pop-up window 1310. Referring to FIG. 13 (b), the detail interest information of the terminal A and the detail interest information of the terminal B are respectively outputted via pop-up windows 1320/1330 different from each other.

Referring to the examples shown in FIGS. 13 (a) and (b), the detail interest information of the terminal A is outputted first (i.e., outputted at the top of the display unit 151) and the detail interest information of the terminal B is outputted later (i.e., outputted at the bottom of the display unit 151). In this case, the interest information to be outputted first among the interest information of the terminal A and the interest information of the terminal B can be determined based on a distance between the terminals and the mobile terminal, a contact frequency between the terminal A and the terminal B, or whether or not a contact is performed recently.

For example, if the terminal A is closer to the mobile terminal compared to the terminal B, the controller 180 can control the interest information of the terminal A to be outputted first compared to the interest information of the terminal B. As a different example, the controller 180 can determine interest information to be outputted first among the interest information of the terminal A and the interest information of the terminal B based on a contact frequency contacted with the terminal A and the terminal B or a most recently contacted terminal among the terminal A and the terminal B.

Referring to FIG. 2, if it is determined as other terminal enters into a prescribed distance from a mobile terminal, profile information or interest information of the other terminal is outputted. In this case, the controller 180 can control feedback such as vibration, sound, or the like to be outputted together with the profile information or the interest information. An output form or a type of the feedback can be controlled according to a distance between the other terminal and the mobile terminal. For example, if the other terminal enters into a first distance from the mobile terminal, the controller 180 outputs vibration of a first type. If the other terminal enters into a second distance from the mobile terminal, the controller 180 can output vibration of a second type.

Unlike the example mentioned earlier in FIG. 2, if the other terminal enters into a prescribed distance from the mobile terminal, the controller 180 can control an indicator indicating the entrance of the other terminal to be outputted. If the indicator or a region corresponding to the indicator is touched after the indicator is outputted, the controller 180 can control profile information or interest information of the user of the other terminal to be outputted.

Figure 14:
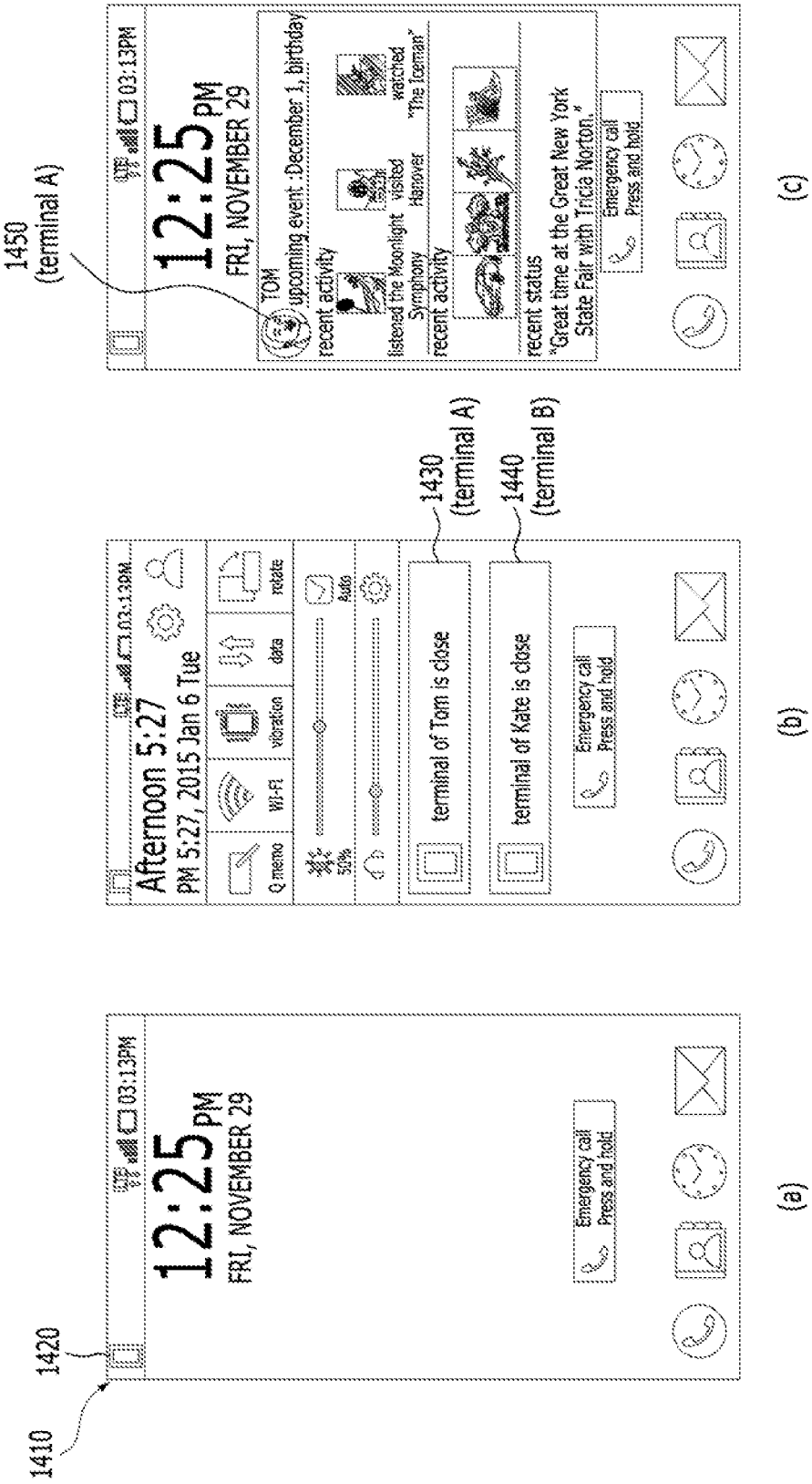
FIG. 14 is a diagram for an example of outputting an indicator to indicate that a mobile terminal is close to other terminal.

For example, FIG. 14 is a diagram for an example of outputting an indicator to indicate that a mobile terminal is close to other terminal. If the other terminal enters into a first distance from the mobile terminal, as shown in the example of FIG. 14 (a), the controller 180 can control an indicator 1420 indicating the approach of the other terminal approached near the mobile terminal to be outputted via a status bar 1410.

Subsequently, if a user input for dragging a pointer touching the status bar into a prescribed direction is received, the controller 180 can control a notification window to be outputted. As shown in the example of FIG. 14 (b), the notification window can include a menu capable of changing (e.g., On/Off control of a communication module such as Wi-Fi, NFC, Bluetooth, GPS, and the like, On/Off control of airplane mode, switching between a vibration mode and a sound mode, etc.) a configuration of the mobile terminal and information of events occurred at the mobile terminal.

If the other terminal enters into the prescribed distance from the mobile terminal, the controller 180 can control event information 1430/1440 to be outputted via the notification window to indicate that the other terminal has entered the prescribed distance from the mobile terminal. If a plurality of terminals enter into a prescribed distance from the mobile terminal, the controller 180 can control a plurality of event information to be outputted. In this case, the event information can be arranged based on a distance between the mobile terminal and each of a plurality of the terminals. For example, referring to the example shown in FIG. 14 (b), since event information 1430 of a terminal A is displayed at the top of event information 1440 of a terminal B, it is able to anticipate that the terminal A is closer to the mobile terminal compared to the terminal B.

If event information is touched, the controller 180 can control profile information or interest information of a terminal corresponding to the touched item to be outputted. For example, as shown in the example of FIG. 14 (b), if event information of the terminal A is touched, the controller 180 can control profile information or interest information of the terminal A to be outputted. In this case, the controller 180 can determine information to be outputted among the profile information and the interest information in consideration of a distance between the mobile terminal and the other terminal.

For example, if the terminal A is located within a first distance from the mobile terminal, the controller 180 can control the profile information of the terminal A to be outputted in response to a touch input touching the event information of the terminal A. If the terminal A is located within a second distance or a third distance from the mobile terminal, the controller 180 can control representative interest information or detail interest information to be outputted in response to the touch input touching the event information of the terminal A. Referring to the example of FIG. 14 (c), detail interest information 1450 of the terminal A is outputted in response to a touch input of a user.

According to one embodiment of the present invention, the aforementioned method (operation flowchart) can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet).

The foregoing embodiments are merely exemplary and are not to be considered as limiting the present disclosure. The present teachings can be readily applied to other types of methods and apparatuses. Thus, it is intended that the present invention covers the modifications and variations of this invention that come within the scope of the appended claims and their equivalents.

The present invention can be applied to various electronic devices capable of performing communication with other terminal.

What is claimed is:

1. A mobile terminal, comprising:
a wireless communication unit configured to perform wireless communication with another terminal;
a display unit configured to display information; and
a controller configured to:
in response to the other terminal being a first distance to the mobile terminal, display profile information of the other terminal via the display unit,
in response to the other terminal being a second distance closer than the first distance to the mobile terminal, display interest information of the other terminal via the display unit,
when a plurality of interest items are contained in the interest information, display a representative interest item among the plurality of the interest items via the display unit, and
in response to the other terminal being a third distance closer than the second distance to the mobile terminal, display an interest list including the plurality of the interest items via the display unit.

2. The mobile terminal of claim 1, wherein if a separation distance between the other terminal and the mobile terminal is equal to or less than the first distance, the controller is configured to display the profile information via the display unit, and
wherein if the separation distance is equal to or less than the second distance, the controller is configured to display the interest information via the display unit.

3. The mobile terminal of claim 2, wherein the controller is configured to calculate a distance between the other terminal and the mobile terminal by comparing location information of the other terminal with location information of the mobile terminal.

4. The mobile terminal of claim 1, wherein the interest information comprises at least one of a multimedia file watched by a user of the other terminal, a place recently visited by the user of the other terminal, an SNS (social network service) activity content of the user of the other terminal, and information on an anniversary of the user of the other terminal.

5. The mobile terminal of claim 4, wherein in response to an interest item corresponding to the multimedia file watched by the user being touched among the interest information, the controller is configured to request the other terminal to transmit the multimedia file corresponding to the touched interest item.

6. The mobile terminal of claim 4, wherein in response to an interest item corresponding to the place recently visited by the user being touched among the interest information, the controller is configured to display information on the place via a web search on the display unit.

7. The mobile terminal of claim 4, wherein in response to an interest item corresponding to the SNS activity content being touched among the interest information, the controller is configured to display an SNS account of the user of the other terminal via the display unit.

8. The mobile terminal of claim 4, wherein in response to an interest item corresponding to the anniversary being touched among the interest information, the controller is configured to display a user interface for adding the anniversary to a schedule via the display unit.

9. The mobile terminal of claim 1, wherein the controller is configured to:
display a circle via the display unit, and
adjust a distance between the circle and a display position at which the profile information or the interest information is displayed based on a distance between the mobile terminal and the other terminal.

10. The mobile terminal of claim 1, wherein in response to a user input touching the profile information, the controller is configured to display the interest information via the display unit.

11. The mobile terminal of claim 1, wherein in response to the other terminal entering into a prescribed distance from the mobile terminal, the controller is configured to display an indicator indicating the approach of the other terminal via the display unit.

12. The mobile terminal of claim 1, wherein in response to a communication signal broadcasted by the other terminal being received via the wireless communication unit, the controller is configured to display the profile information via the display unit.

13. The mobile terminal of claim 12, wherein in response to a strength of the communication signal being equal to or greater than a prescribed reference value, the controller is configured to display the interest information via the display unit.

14. The mobile ten final of claim 12, wherein the communication signal corresponds to a beacon signal broadcasted by the other terminal.

15. The mobile terminal of claim 1, wherein the controller is configured to display the profile information or the interest information via the display unit when the other terminal has an access authority.

16. The mobile terminal of claim 1, wherein in response to an additional other terminal being close to the mobile terminal, the controller is configured to display interest information common to the other terminal and the additional other terminal via the display unit.

17. The mobile terminal of claim 1, wherein in response to the other terminal being a fourth distance closer to the mobile terminal than the third distance, the controller is configured to stop displaying the profile information and the interest information.

18. A method of controlling a mobile terminal, the method comprising:
wirelessly communicating, via a wireless communication unit of the mobile terminal, with another terminal;

in response to the other terminal being a first distance to the mobile terminal, displaying profile information of the other terminal via a display unit of the mobile terminal;

in response to the other terminal being a second distance closer than the first distance to the mobile terminal, displaying interest information of the other terminal via the display unit, when a plurality of interest items are contained in the interest information, displaying a representative interest item among the plurality of the interest items via the display unit; and in response to the other terminal being a third distance closer than the second distance to the mobile terminal, displaying an interest list including the plurality of the interest items via the display unit.

* * * * *